(12) United States Patent
Iwai et al.

(10) Patent No.: US 8,422,484 B2
(45) Date of Patent: *Apr. 16, 2013

(54) RADIO TRANSMISSION DEVICE, AND RADIO TRANSMISSION METHOD

(75) Inventors: Takashi Iwai, Ishikawa (JP); Daichi Imamura, Kanagawa (JP); Kenichi Miyoshi, Kanagawa (JP); Sadaki Futagi, Ishikawa (JP); Atsushi Matsumoto, Ishikawa (JP); Tomofumi Takata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 269 days.

This patent is subject to a terminal disclaimer.

(21) Appl. No.: 12/882,032

(22) Filed: Sep. 14, 2010

(65) Prior Publication Data

US 2011/0002321 A1 Jan. 6, 2011

Related U.S. Application Data

(63) Continuation of application No. 12/278,543, filed on Aug. 6, 2008, now Pat. No. 7,821,991.

(30) Foreign Application Priority Data

Feb. 10, 2006 (JP) ................................. 2006-034297
Jul. 27, 2006 (JP) ................................. 2006-205267

(51) Int. Cl.
  *H04J 3/06* (2006.01)
(52) U.S. Cl.
  USPC .......................................... 370/350; 455/434
(58) Field of Classification Search ........................ None
  See application file for complete search history.

(56) References Cited

U.S. PATENT DOCUMENTS

| 6,567,482 | B1 * | 5/2003 | Popovic' ........................ 375/343 |
| 7,324,465 | B2 | 1/2008 | Lim |
| 7,821,991 | B2 * | 10/2010 | Iwai et al. ...................... 370/328 |
| 2003/0076812 | A1 * | 4/2003 | Benedittis ...................... 370/350 |
| 2004/0157602 | A1 | 8/2004 | Khawand |

(Continued)

FOREIGN PATENT DOCUMENTS

JP 2002-208880 7/2002

OTHER PUBLICATIONS

International Search Report dated Mar. 13, 2007 in English.

(Continued)

*Primary Examiner* — Anh-Vu Ly
(74) *Attorney, Agent, or Firm* — Dickinson Wright PLLC

(57) ABSTRACT

Provided are a radio transmission device and a radio transmission method, which prevent the deterioration of a preamble detecting performance while reducing the collision probability of a RACH. In this radio transmission device, a Signature table storage unit (103) divides the magnitudes of transmission loss levels into individual levels corresponding to the distances from a base station, to cause CAZAC series and circulation shift quantities to correspond to each other at the individual levels, and is provided with a table containing a plurality of Signatures created from the CAZAC series and the circulation shift quantities caused to correspond to each other. A Signature selecting unit (104) selects one of the corresponding Signatures at random from the Signature table storage unit (103), on the basis of the magnitude of the transmission loss level outputted from a transmission loss level deciding unit (102). A RACH signal generating unit (105) generates the RACH signal with the Signature selected.

10 Claims, 14 Drawing Sheets

U.S. PATENT DOCUMENTS

| | | | |
|---|---|---|---|
| 2007/0165567 A1* | 7/2007 | Tan et al. | 370/329 |
| 2007/0184865 A1 | 8/2007 | Phan | |
| 2008/0285670 A1 | 11/2008 | Walton | |
| 2009/0137262 A1 | 5/2009 | Willenegger | |
| 2010/0002671 A1* | 1/2010 | Iwai et al. | 370/342 |

OTHER PUBLICATIONS

3GPP TSG RAN WG1 LTE Ad Hoc Meeting R1-060046, NTT DoCoMo, NEC, Sharp, "Orthogonal Pilot Channel Structure in E-UTRA Uplink," Jan. 25, 2006, Internet <URL:http://www.3gpp.org/ftp/tsg_ran/WG1_RL1/TSGRI_AH/LTE_AH_January 06/Docs/R1-060046.zip>.

3GPP TSG-RAN WG1 LTE Ad Hoc Meeting R1-060060, NEC Group, "Performance of CAZAC pilot sequence for D-FDMA and L-FDMA with Frequency Hopping for EUTRA Uplink," Jan. 25, 2006, Internet <URL: http://www.3gpp.org/ftp/tsg_ran/WG1_RL1/TSGR1_AH/LTE AH January-06/Docs/R1-0600602.zip>.

3GPP TS 25.213, V6.4.0 (Sep. 2005), "3$^{rd}$ Generation Partnership Project; Technical Specification Group Radio Access Network; Spreading and modulation (FDD) (Release 6)," Technical Specification, pp. 1-32.

* cited by examiner

| PROPAGATION LOSS LEVEL | SIGNATURE NUMBER | CAZAC SEQUENCE NUMBER | CYCLIC SHIFT NUMBER |
|---|---|---|---|
| HIGH (ASSUMPTION OF CELL RADIUS < 30km) | #1 | CAZAC #1 | SHIFT #1 |
| | ... | | ... |
| | #4 | | SHIFT #4 |
| MEDIUM (ASSUMPTION OF CELL RADIUS < 15km) | #5 | CAZAC #2 | SHIFT #1 |
| | ... | | ... |
| | ... | | ... |
| | #12 | | SHIFT #8 |
| LOW (ASSUMPTION OF CELL RADIUS < 5km) | #13 | CAZAC #3 | SHIFT #1 |
| | ... | | ... |
| | #35 | | SHIFT #23 |
| | #36 | | SHIFT #24 |

FIG.5

| PROPAGATION LOSS LEVEL | SIGNATURE NUMBER | CAZAC SEQUENCE NUMBER | CYCLIC SHIFT NUMBER | SHIFT VALUE | TRANSMISSION BANDWIDTH |
|---|---|---|---|---|---|
| HIGH (ASSUMPTION OF CELL RADIUS < 10km) | #1 | CAZAC #1 | SHIFT #1 | HIGH (6usec) | NARROWBAND (1.25MHz) |
| | ... | | ... | | |
| | #6 | | SHIFT #6 | | |
| LOW (ASSUMPTION OF CELL RADIUS < 2.5km) | #1 | | SHIFT #1 | LOW (16.5usec) | BROADBAND (5MHz) |
| | ... | | ... | | |
| | #24 | | SHIFT #24 | | |

FIG.12

| PROPAGATION LOSS LEVEL | SIGNATURE NUMBER | $N=sm^2$ | s | m | sm (RANGE OF ZERO INTER-CORRELATION) | a(k) NUMBER r | b(k) NUMBER l #1~m |
|---|---|---|---|---|---|---|---|
| HIGH (ASSUMPTION OF CELL RADIUS < 15km) | #1 ... #4 | 400 | 25 | 4 | 100 →100[us] | #1 | #1 ... #4 |
| MEDIUM (ASSUMPTION OF CELL RADIUS < 10km) | #1 ... #6 | 396 | 11 | 6 | 66 →66[us] | #2 | #1 ... #6 |
| LOW (ASSUMPTION OF CELL RADIUS < 6km) | #1 ... #10 | 400 | 4 | 10 | 40 →40[us] | #3 | #1 ... #10 |

FIG.13

| PROPAGATION LOSS LEVEL | SIGNATURE NUMBER | N=tm | t | m | t (RANGE OF ZERO INTER-CORRELATION) | a(k) NUMBER r | b(k) NUMBER t #1~m |
|---|---|---|---|---|---|---|---|
| HIGH (ASSUMPTION OF CELL RADIUS < 15km) | #1 .. #4 | 400 | 100 | 4 | 100 →100[us] | #1 | #1 .. #4 |
| MEDIUM (ASSUMPTION OF CELL RADIUS < 10km) | #1 .. .. #6 | 396 | 66 | 6 | 66 →66[us] | #2 | #1 .. .. #6 |
| LOW (ASSUMPTION OF CELL RADIUS < 6km) | #1 .. .. .. #10 | 400 | 40 | 10 | 40 →40[us] | #3 | #1 .. .. ... #10 |

FIG.14

RADIO TRANSMISSION DEVICE, AND RADIO TRANSMISSION METHOD

This is a continuation application of application Ser. No. 12/278,543 filed Aug. 6, 2008, which is a national stage of PCT/JP2007/052357 filed Feb. 9, 2007, which is based on Japanese Application No. 2006-034297 filed Feb. 10, 2006, and Japanese Application No. 2006-205267 filed Jul. 27, 2006, the entire contents of each which are incorporated by reference herein.

TECHNICAL FIELD

The present invention relates to a radio transmitting apparatus and radio transmission method for transmitting the RACH (Random Access Channel).

BACKGROUND ART

Currently, in 3GPP RAN LTE (Long Term Evolution), studies are being conducted for a RACH transmission method. The RACH refers to an uplink channel which a mobile station uses upon transferring from idle mode to a calling step and to transmit information required to establish a scheduled channel to the base station. The RACH cannot be scheduled by the base station, and so a mobile station takes the initiative in randomly selecting transmission resources (e.g. code pattern). If the transmission resources overlap between a plurality of users and their RACH's collide, the base station cannot receive these successfully, and the mobile stations have to retransmit the RACH's.

In LTE, including at least a signature, which is terminal identification information, into the RACH, is studied. Moreover, as the configuration of the signatures as in W-CDMA (Wideband-Code Division Multiple Access), to improve C/N by detecting different signatures at the same time and by spreading gain, studies are conducted for separating mobile station signature numbers using signature patterns (code patterns) of good correlation characteristics.

In a conventional RACH signature pattern, codes that have good autocorrelation characteristics and cross-correlation characteristics and have low PAPR (Peak to Average Power Ratio), are used in order to detect the signatures (terminal identification information) based on correlation characteristics calculated at the receiving side. As a code sequence having these features, the cyclic shift based CAZAC sequence shown in FIG. 1 is known (see non-Patent document 1). This is a code sequence obtained by cyclically shifting a CAZAC sequence, so that it is possible to detect different signatures at the receiving side at the same time by associating signature numbers with cyclic shift values. Features of CAZAC (Constant Amplitude Zero Auto-Correlation) include good autocorrelation characteristics and zero correlation between codes shifting the same code. Moreover, these CAZAC codes show relatively low cross-correlation but are not completely orthogonal.

Non-patent Document 1: 3GPP, R1-060046, NTT DoCoMo, "Orthogonal Pilot Channel Structure in E-UTRA Uplink"

DISCLOSURE OF INVENTION

Problems to be Solved by the Invention

However, when the cyclic shift based CAZAC sequence disclosed in Non-patent document 1 is used for RACH signature patterns, there are the following problems. That is, the number of signatures that can be generated from one CAZAC sequence is limited. The number of signatures that can be generated from one CAZAC sequence is calculated by the following equation 1.

[1]

$$\text{The number of signatures} = \text{the length of the preamble}/\Delta \quad \text{(Equation 1)}$$

Here, $\Delta$ is the cyclic shift value. It is necessary that the cyclic shift value is greater than the maximum propagation delay time of a mobile station. This reason is, a delay wave at a mobile station beyond the cyclic shift value may have greater correlation with a different CAZAC, and this may result in detecting wrong signatures. The maximum propagation delay time of this mobile station depends on the cell radius.

The number of signatures that can be generated from one CAZAC sequence is specifically derived. As studied in LTE, assuming a 30 km cell radius, the maximum propagation delay time is about 210 μs taking into consideration the propagation delay time and the path delay time (i.e. delay spread). That is, $\Delta$ needs to be greater than 210 μs. Moreover, assuming that the length of the preamble (the CAZAC length) is 1 ms as in W-CDMA, the number of signatures that can be generated from one CAZAC sequence is four. This is relatively small given that the number of signatures in W-CDNA is sixteen, and the RACH collision rate increases.

Then, to increase the number of signatures, it is possible to use different CAZAC sequences. To hold the number of signatures sixteen as in W-CDMA, multiplexing four codes of different CAZAC sequences (see FIG. 2) is required, as calculated by following equation 2.

[2]

$$\text{The number of signatures} = \text{the length of the preamble}/\Delta \times \text{the number of different } CAZAC \text{ sequences} \quad \text{(Equation 2)}$$

However, as shown in the preamble detection performance in FIGS. 3A and 3B with respect to two different cases where the same cyclic shift based CAZAC sequences are multiplexed and where different cyclic shift based CAZAC sequences are multiplexed, if different CAZAC sequences are multiplexed, inter-code interference occurs, and, consequently, preamble detection performance is deteriorated.

Generally, when the number of different CAZAC sequences multiplexed increases, inter-code interference increases and signature detection performance is deteriorated.

It is therefore an object of the present invention to provide a radio transmitting apparatus and radio transmission method that can reduce the RACH collision rate and prevent deterioration of preamble detection performance.

Means for Solving the Problem

The radio transmitting apparatus of the present invention adopts a configuration including: an estimation section that estimates an amount of propagation delay based on a downlink signal; a selection section that provides in advance cyclic shift values for cyclically shifting the code sequences used for signatures to include a random access channel in association with amounts of propagation delay, and selects a signature generated from a code sequence using a cyclic shift value associated with the estimated amount of propagation delay; a generating section that generates a random access channel signal including the selected signature; and a transmission section that transmits the generated random access channel signal.

The radio transmission method of the present invention includes steps of: estimating an amount of propagation delay based on a downlink signal; providing in advance cyclic shift values for cyclically shifting the code sequences used for signatures to include a random access channel in association with amounts of propagation delay, and selecting a signature generated from a code sequence using a cyclic shift value associated with the estimated amount of propagation delay; generating a random access channel signal including the selected signature; and transmitting the generated random access channel signal.

Advantageous Effect of the Invention

The present invention makes it possible to reduce the RACH collision rate and prevent deterioration of preamble detection performance.

BRIEF DESCRIPTION OF DRAWINGS

FIG. 5 illustrates the signature table held in the signature table storage section shown in FIG. 4;

FIG. 12 illustrates a signature table held in the signature table storage section shown in FIG. 11;

FIG. 13 illustrates a signature table according to Embodiment 3 of the present invention;

FIG. 14 illustrates a signature table; and

BEST MODE FOR CARRYING OUT THE INVENTION

Figure 1:
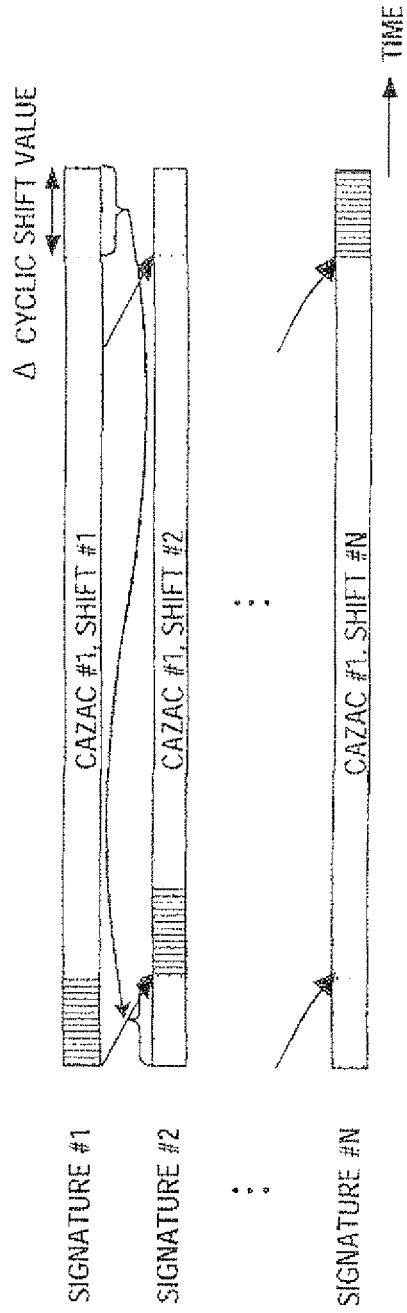
FIG. 1 illustrates the cyclic shift based CAZAC sequences disclosed in non-patent document 1.
Figure 2:
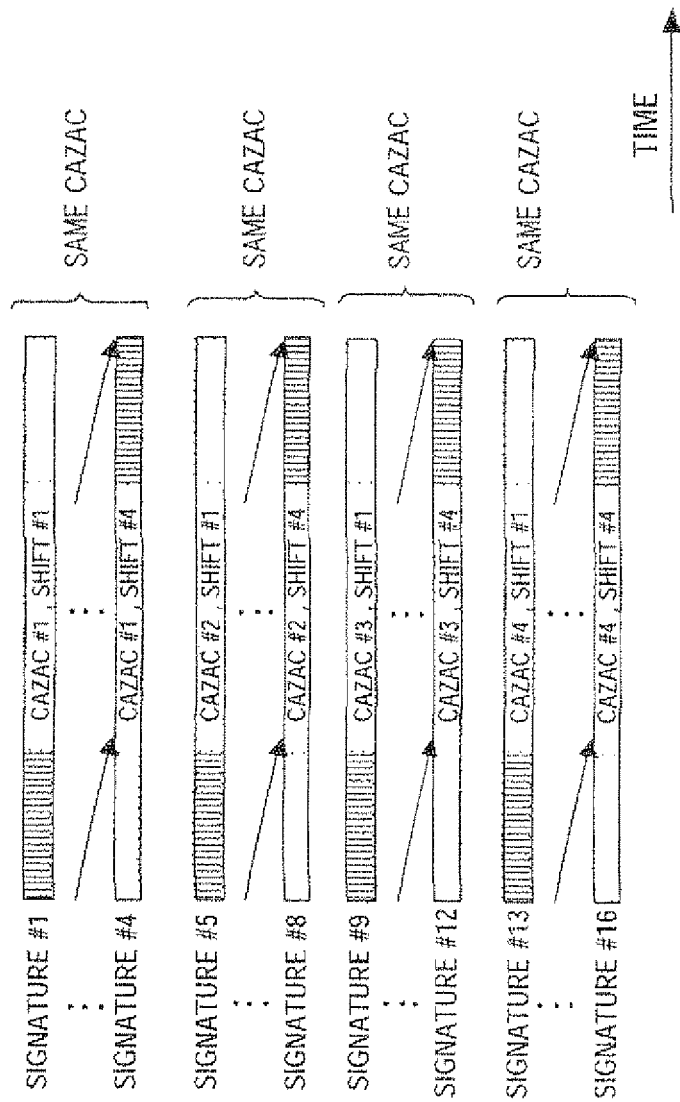
FIG. 2 illustrates multiplexing four codes of different CAZAC sequences.
Figure 3A:
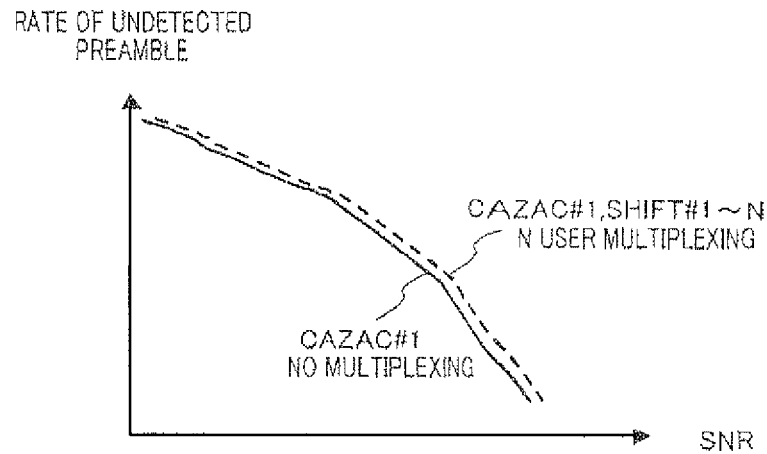
FIG. 3A shows preamble detection performance.
Figure 3B:
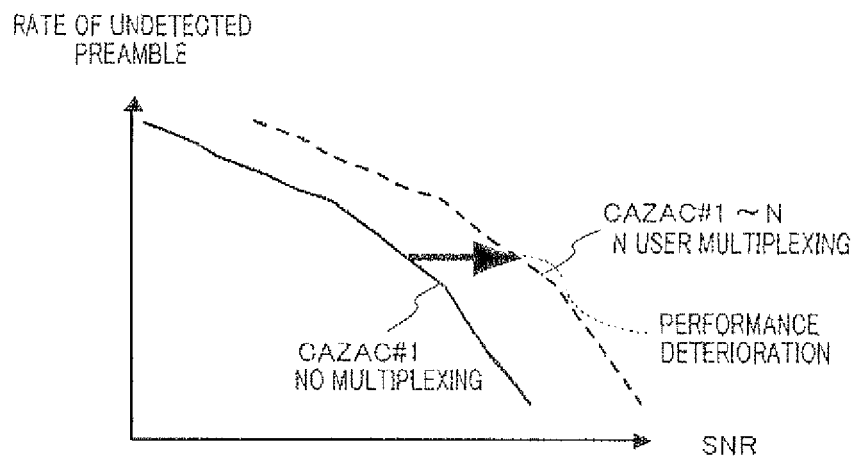
FIG. 3B shows preamble detection performance.

Now, embodiments of the present invention will be described in detail with reference to the accompanying drawings. Further, in embodiments, the components having the same functions will be assigned the same reference numerals and overlapping descriptions will be omitted.

Embodiment 1

Figure 4:
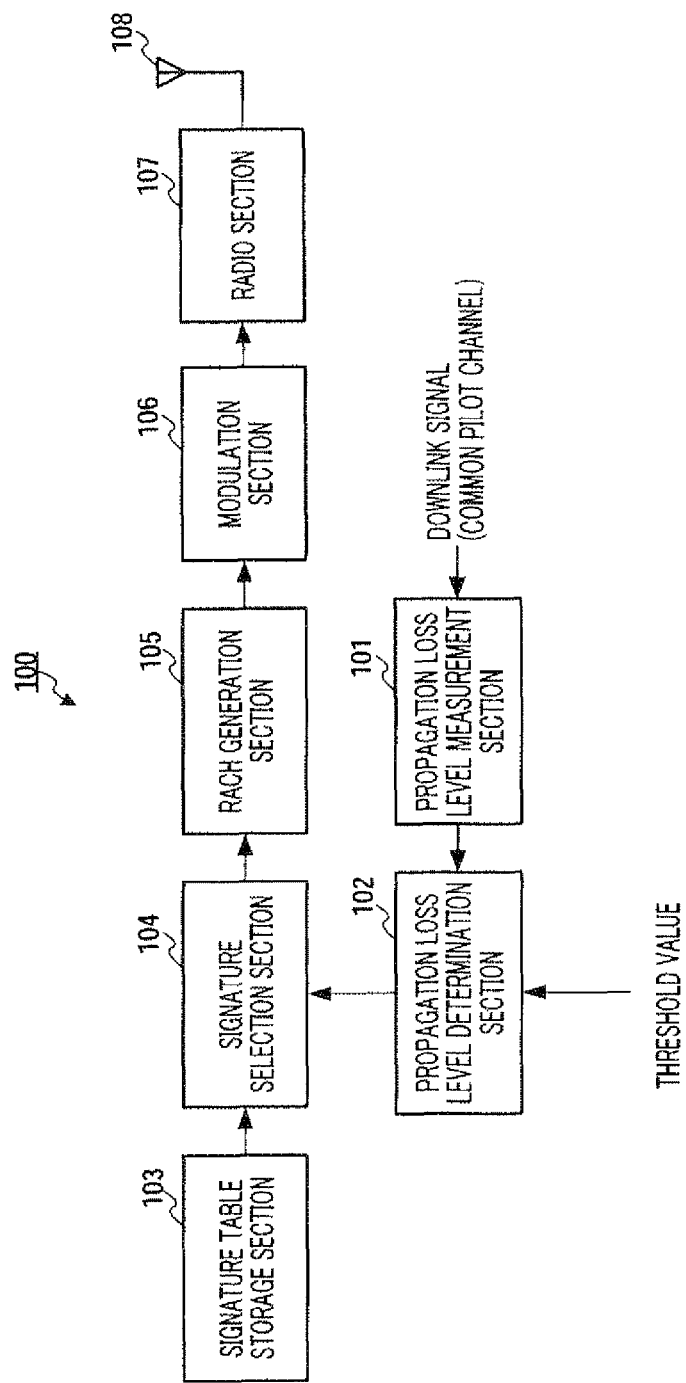
FIG. 4 is a block diagram showing the configuration of the transmitting apparatus according to Embodiment 1 of the present invention.

FIG. 4 is a block diagram showing the configuration of transmitting apparatus 100 according to Embodiment 1 of the present invention. Referring to this figure, propagation loss level measurement section 101 calculates the propagation loss level (attenuation of signal power[dB]) by measuring the received power for a downlink signal (common pilot channel) and subtracting the measured received power from known transmission power.

The calculated propagation loss level is outputted to propagation loss level determination section 102. The common pilot channel has its transmission power determined in advance by the system and is transmitted with fixed power.

Propagation loss level determination section 102 makes a threshold decision between the propagation loss level outputted from propagation loss level measurement section 101 and certain threshold values set in advance. Two different threshold values of threshold Th1 and threshold Th2 that is lower than Th1, are used here, and the propagation loss level is classified into three levels of high, medium and low. That is, propagation loss level determination section 102 determines that the propagation loss level is "high" if the propagation loss level is equal to or more than the threshold value Th1, determines that the propagation loss level is "medium" if the propagation loss level is equal to or more than the threshold value Th2 and less than the threshold value Th1, and determines that the propagation loss level is "low" if the propagation loss level is less than the threshold value Th2. The determination result of propagation loss level (i.e. high, medium or low level) is outputted to signature selection section 104. Propagation loss level measurement section 101 and propagation loss level determination section 102 have function as a propagation delay amount estimating means.

Signature table storage section 103 stores a table (i.e. signature table) that associates the propagation loss levels of "large," "medium" and "low," with respective CAZAC sequences and cyclic shift values, and associates signatures generated from the CAZAC sequences with the associations of the propagation loss levels, CAZAC sequences and cyclic shift values. The signature table will be described later in detail.

From signature table storage section 103, signature selection section 104 randomly reads one of the signatures matching the propagation loss level determination result outputted from propagation loss level determination section 102 and outputs the read signature to RACH generation section 105.

RACH generation section 105 generates a RACH signal, in which the signature outputted from signature selection section 104 is the preamble, and outputs the generated RACH signal to modulation section 106.

Modulation section 106 modulates the RACH signal outputted from RACH generation section 105, and radio section 107 performs predetermined radio transmission processing including D/A conversion and up-conversion on the modulated RACH signal and transmits the RACH signal subjected to radio transmission processing from antenna 108.

FIG. 5 shows the signature table held in signature table storage section 103 shown in FIG. 4. In this figure, the "high," "medium" and "low" propagation loss levels correspond to the levels of signal power attenuation, which depend upon the distance from the base station. For example, the "high" propagation loss level assumes a cell radius of maximum 30 km, the "medium" propagation loss level assumes a cell radius of maximum 15 km and the "low" propagation loss level assumes a cell radius of maximum 5 km.

Figure 6:
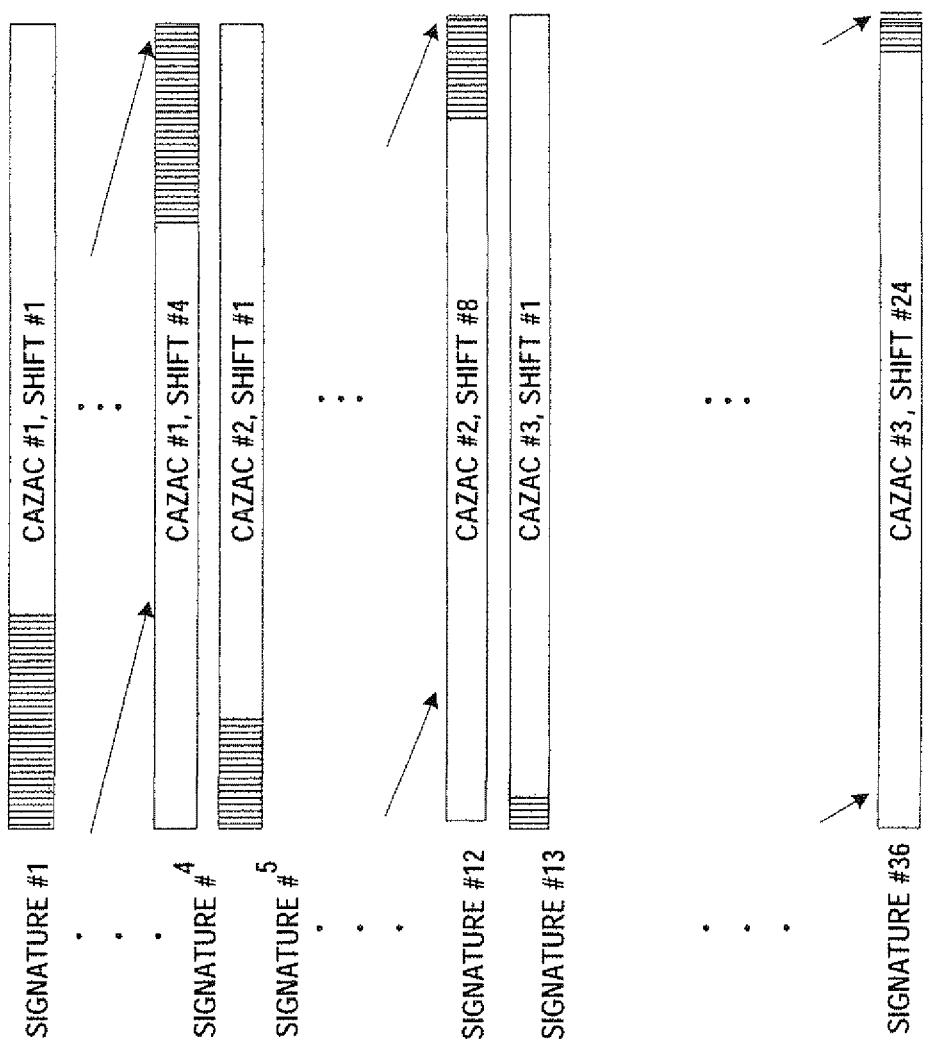
FIG. 6 shows cyclic shift values depending on propagation loss levels.

Then, the "high," "medium" and "low" propagation loss levels are associated with respective CAZAC sequences (CAZAC #1 to #3) and cyclic shift values. To be more specific, the cyclic shift value increases when the propagation loss level is higher and decreases when the propagation loss level is lower, as shown in FIG. 6. Accordingly, the number of signatures generated decreases when the propagation loss level is higher, and increases when the propagation loss level is lower. That is, the "high" propagation loss level is associated with CAZAC #1, and the number of signatures generated from CAZAC #1 is four (i.e. signatures #1 to #4). Moreover, the "medium" propagation loss level is associated with CAZAC #2, and the number of signatures generated from CAZAC #2 is eight (i.e. signatures #5 to #12). Furthermore, the "low" propagation loss level is associated with CAZAC #3, and the number of signatures generated from CAZAC #3 is twenty four (i.e. signatures #13 to #36).

Here, the reason that the cyclic shift value is smaller for lower propagation loss levels is that the amount of propagation delay can be estimated from the scale of the propagation loss level. That is, when propagation loss is little, it is possible to estimate that the distance from the base station is short and the amount of propagation delay is little. On the other hand, the estimation is more difficult if the propagation loss level is high, because it is not possible to determine directly that the distance from the base station is long. The reason is that, for example, when a mobile station is in a building, even though the distance from the base station may be short, the propagation loss is more likely to increase. Accordingly, when propagation loss is great, the propagation delay time cannot be estimated, and so, with an assumption that the distance from the base station is long, and increased cyclic shift value is set.

Next, a method whereby signature selection section 104 selects signatures from the signature table shown in FIG. 5, will be explained. For example, when signature selection section 104 acquires a determination result specifying the "high" propagation loss level from propagation loss level determination section 102, signature selection section 104 randomly selects a signature, from the signatures #1 to #4 associated with the CAZAC #1. On the other hand, when signature selection section 104 acquires a determination result specifying the "low" propagation loss level from propagation loss level determination section 102, signature selection section 104 randomly selects a signature, from the signatures #13 to #36 associated with the CAZAC #3.

Figure 7:
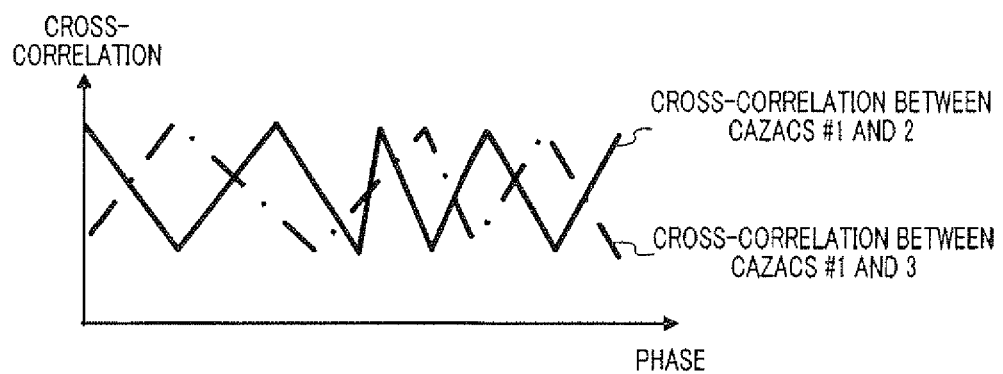
FIG. 7 illustrates cross-correlation characteristics between CAZAC sequences.
Figure 8:
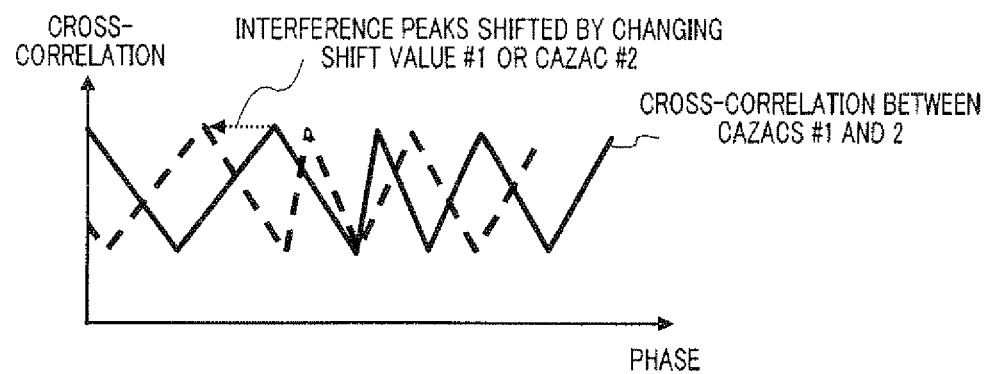
FIG. 8 illustrates cross-correlation characteristics when the shift value is changed between the CAZAC sequences.

As for the CAZAC sequences shown in FIG. 5, selecting the combination of CAZAC sequences where cross-correlation between codes (i.e. inter-code interference) is as little as possible results in further decreasing the amount of interference. For example, as shown in FIG. 7, the sequences where interference peaks do not overlap are used based on cross-correlation characteristics between CAZAC sequences. Moreover, even when the sequences where interference peaks overlap, the peaks can be shifted by changing the shift values as shown in FIG. 8. Consequently, by selecting a signature with little interference taking into account the CAZAC sequence and the shift value, preamble detection performance can be further improved.

As in the conventional cases, the receiving side finds correlation between the received signal and all the signature patterns that may be transmitted, and calculates a delay profile for each signature. Then, the receiving side makes preamble detection decision by searching for correlation peaks in the delay profiles. At this time, the delay profile detecting window (the detection range) needs to be set in a time length equal to or wider than the cyclic shift value of the signature. The setting as such makes it possible to detect preambles using cyclic shift based CAZAC sequences without interference with other signatures.

Figure 9:
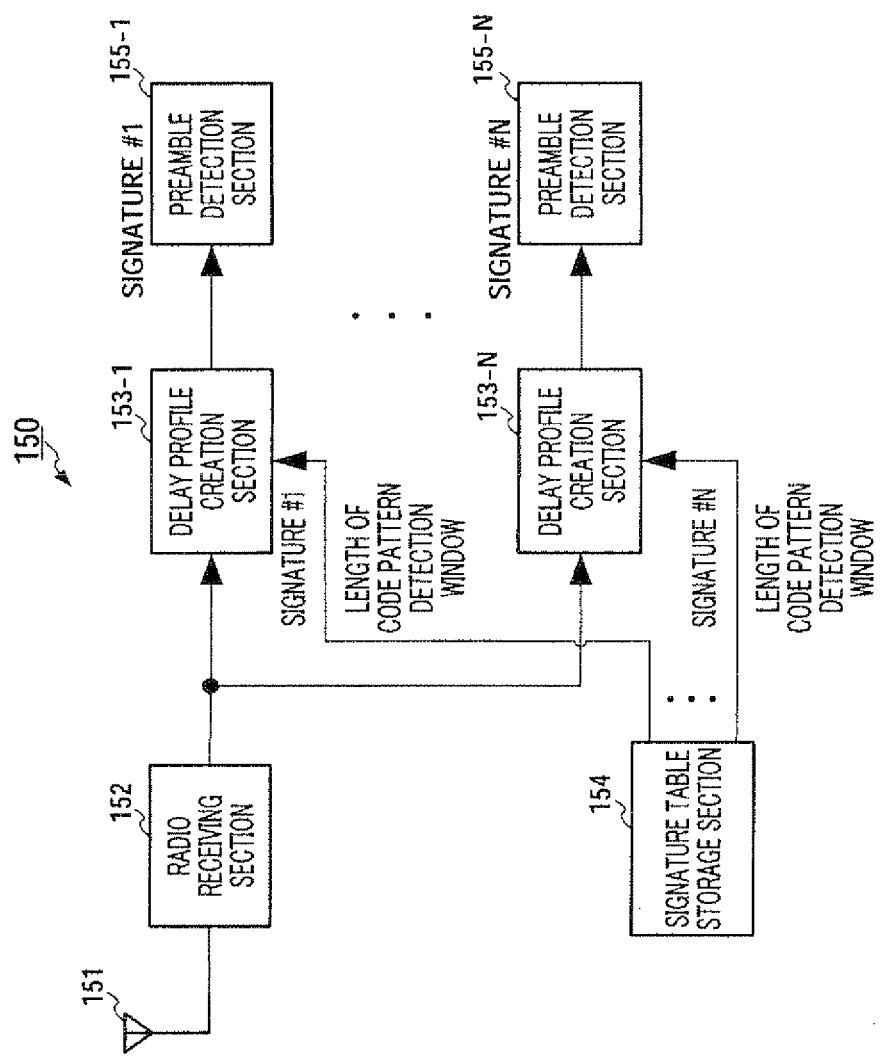
FIG. 9 is a block diagram showing the configuration of the receiving apparatus according to Embodiment 1 of the present invention.

FIG. 9 is a block diagram showing the configuration of receiving apparatus 150 according to Embodiment 1 of the present invention. Referring to this figure, radio receiving section 152 performs predetermined radio receiving processing including down-conversion or A/D conversion on the received signals via antennas 151 and outputs the signals after radio receiving processing to delay profile creation sections 153-1 to 153-N.

Signature table storage section 154 sets the signature patterns fixed and stored between transmission side and reception side in advance and the associated preamble detection windows, in delay profile creation sections 153-1 to 153-N.

Delay profile creation sections 153-1 to 153-N calculate delay profiles that calculate the correlation values between the received signal outputted from radio receiving section 152 and the signatures #1 to N from table storage section 154 every receiving timing. Here, the range in which the delay profiles are made is the length of the preamble detection window from signature table storage section 154.

By searching for the correlation peaks within the preamble windows in the delay profiles and comparing the correlation peaks with predetermined thresholds, preamble detection sections 155-1 to 155-N perform preamble detection determination (determining whether or not there is a preamble signal of interest).

In this way, according to Embodiment 1, the number of CAZAC sequences multiplexed can be reduced by classifying propagation loss levels, that is, the magnitudes of an amount of propagation delay, into levels that depend upon the distance from the base station, associating the CAZAC sequences and cyclic shift values matching the individual levels, and using, in the RACH, signatures generated from the CAZAC sequence and cyclic shift value associated with the measured propagation loss level, so that it is possible to reduce inter-code interference and improve preamble detection performance. Moreover, the number of signatures can increase, so that it is less likely that randomly selected signatures overlap between transmitting apparatuses, and the RACH collision rate is reduced. Particularly, a transmitting apparatus that an amount of propagation delay is low can select a signature from a lot of signatures, so that it is possible to reduce the RACH collision rate further.

Moreover, although a case has been explained above with the present embodiment where the threshold values for use in threshold decisions of the propagation loss level are fixed, the present invention is not limited to this, and it is equally possible that the base station controls the threshold values and signals these controlled threshold values as information unique to the base station through the BCH (Broadcast CHannel) to the mobile stations in the cell, and the mobile stations use the threshold values reported from the base station. This makes it possible to control the number of mobile stations for each propagation loss level and reduce the RACH collision rate transmitted from the mobile station.

Embodiment 2

Figure 10:
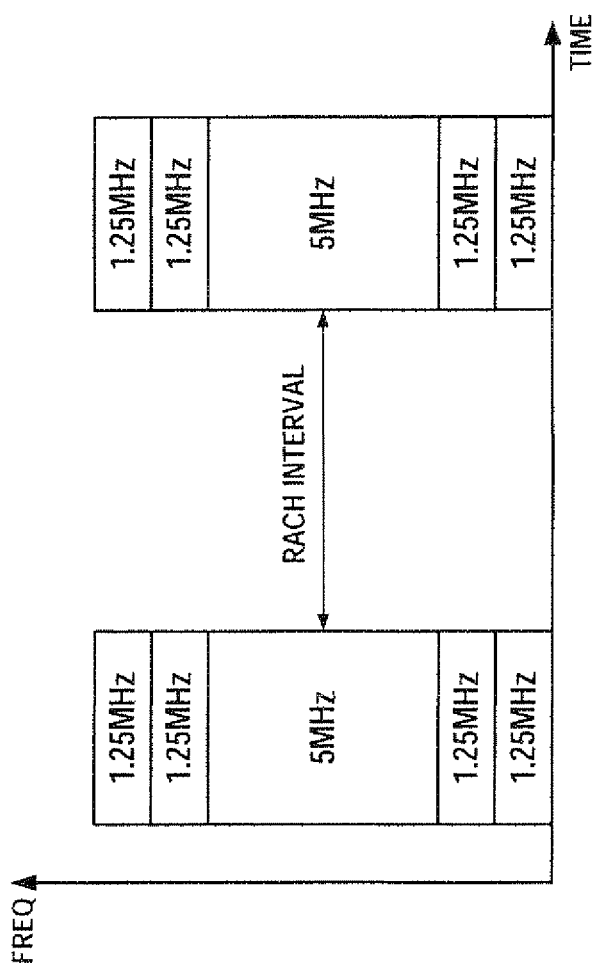
FIG. 10 illustrates a plurality of RACH transmission slots of different bandwidths.

A case will be assumed with Embodiment 2 of the present invention where a plurality of RACH transmission slots (hereinafter "RACH slots") of different bandwidths are adopted as shown in FIG. 10. Here, broadband RACH slots (for example, 5 MHz bandwidth) and narrowband RACH slots (for example, 1.25 MHz bandwidth) are prepared in FDM or TDM. The broadband RACH slot and the narrowband RACH slot have the same slot length.

Figure 11:
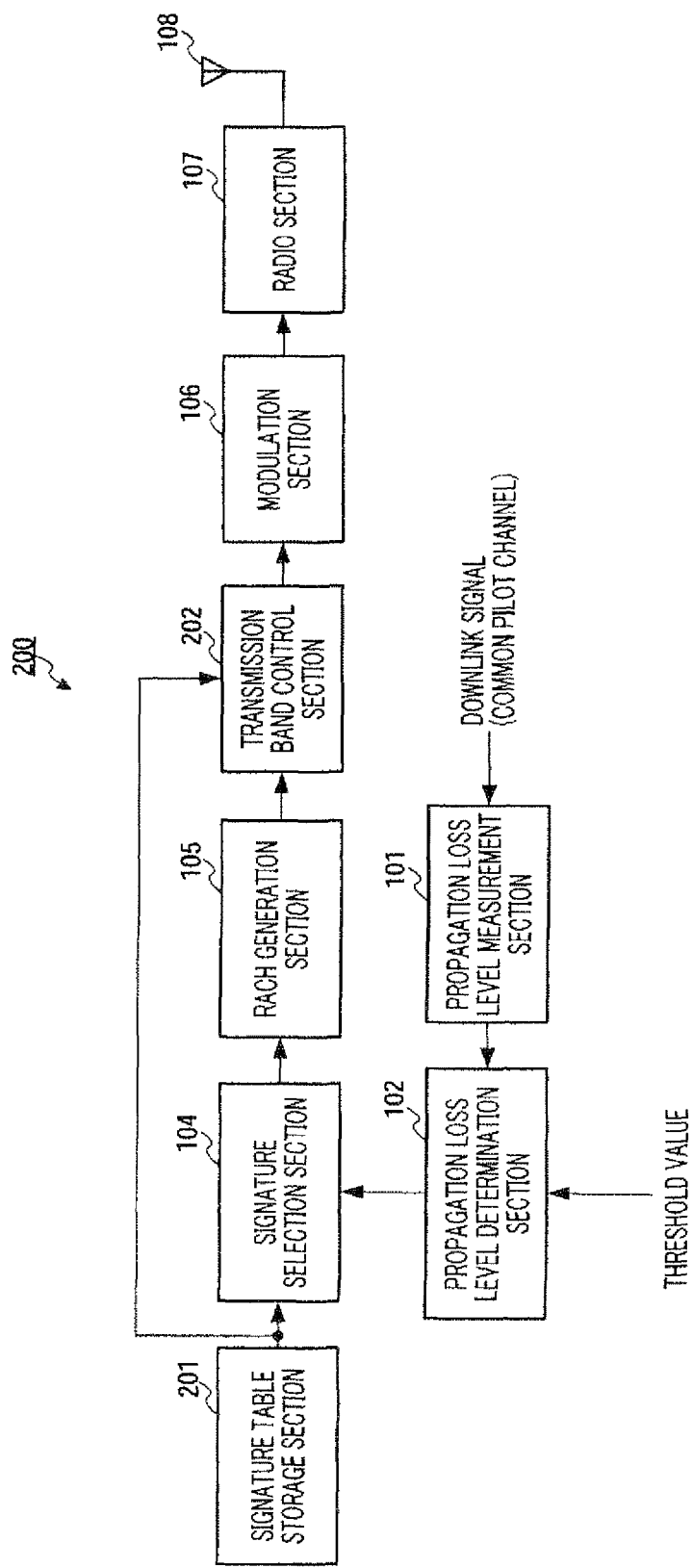
FIG. 11 is a block diagram showing the configuration of the transmitting apparatus according to Embodiment 2 of the present invention.

FIG. 11 is a block diagram showing the configuration of transmitting apparatus 200 according to Embodiment 2 of the present invention. FIG. 11 is different from FIG. 4 in that transmission band control section 202 is added and signature table storage section 103 is changed to signature table storage section 201.

In FIG. 11, signature table storage section 201 associates the propagation loss levels of "high" and "low" with respective cyclic shift values and transmission bandwidths, and stores a table (i.e. signature table) where signatures generated from the CAZAC sequences are associated with the associations of the cyclic shift values and transmission bandwidths. The signature table will be described later in detail.

Transmission band control section 202 reads one of the transmission bandwidths matching the propagation loss levels from signature table storage section 201 and controls the transmission bandwidth for the RACH signal outputted from RACH generation section 105 based on the read transmission bandwidth. The RACH signal subjected to transmission bandwidth control is outputted to modulation section 106.

FIG. 12 shows the signature table held in signature table storage section 201 shown in FIG. 11. Referring to this table, the "high" propagation loss level assumes a cell radius of maximum 10 km, and the "low" propagation loss level assumes a cell radius of maximum 2.5 km. Then, the "high" and "low" propagation loss levels are associated with respective cyclic shift values and transmission bandwidths. The cyclic shift value increases when the propagation loss level is higher and decreases when the propagation loss level is lower. The transmission bandwidth is made narrower when the propagation loss level is higher and is made broader when the propagation loss level is lower.

In this way, when the propagation loss level is high, it is possible that the mobile station is located near a cell edge and is unable to increase transmission power, so that, by allowing the mobile station to transmit the RACH signal in a narrowband and hop between frequencies, it is possible to utilize frequency selective fading and reduce the average number of times the RACH is retransmitted. On the other hand, if the propagation loss level is low, it is possible that the mobile station is located near the base station and is able to increase transmission power, so that, by transmitting in a broadband, the mobile station can acquire frequency diversity effect and reduce the average number of times the RACH is retransmitted.

In this way, according to Embodiment 2, the average number of times RACH is retransmitted can be reduced by classifying propagation loss levels, associating the cyclic shift values of CAZAC sequences with transmission bandwidths for the RACH depending on the levels, transmitting the RACH in a narrowband when propagation loss level is high and transmitting the RACH in a broadband when propagation loss level is low.

Embodiment 3

With Embodiment 3 of the present invention, a case will be explained employing the ZCZ-GCL (Zero Correlation Zone-Generalized Chirp Like) sequence.

First, the ZCZ-GCL sequence will be explained. The ZCZ-GCL sequence $C_i(k)$ is represented by the following equation 3:

[1]

$$C_i(k)=a(k)b_i(k \bmod m), k=0,1,\ldots,N-1,$$
$$i=0,1,\ldots,m-1 \quad \text{(Equation 3)}$$

where N is the code length, and, $N=sm^2$ (s and m are integers).

Moreover, a(k) is referred to as the "carrier sequence" and is represented by the following equation 4.

[2]

$$a(k)=W_N^{k(k+N \bmod 2)/2+qk}, k=0,1,\ldots,N-1 \quad \text{(Equation 4)}$$

where $W_N=\exp(j2\pi\gamma/N)$, $\gamma$ and N are coprime integers, and q is an integer.

$b_i(k)$ is referred to as the modulation sequence, and, as to the ZCZ-GCL sequence, the Hadamard sequence of the following equation 5 or the DFT (Discrete Fourier Transform) sequence of the following equation 6 is generally used. The code length of the modulation sequence is m, and there are m kinds of sequences.

(Equation 5)
$$b_i(k) = (-1)^{\sum_{l=0}^{m-1} i_l k_l}, i, k = 0, 1, \ldots, m-1 \quad [3]$$

(Equation 6)
$$b_i(k) = W_m^{ik}, i, k = 0, 1, \ldots, m-1 \quad [4]$$

Features of the ZCZ-GCL sequence include that cross-correlation is zero between ZCZ-GCL sequences with sharing the same carrier sequence and yet having different modulation sequences, within the range of delay time not greater than sm, and orthogonality holds within this range. The modulation sequence holding orthogonality as such can be generated m sequences for the code length $N=sm^2$.

That is, if the code length N ($=sm^2$) is virtually the same between these sequences and the delay time of the received preamble signals is long, it is necessary to increase $\tau=sm=N/m$, and the number of sequences m holding orthogonality decreases. On the other hand, if the delay time is short, it is possible to decrease $\tau=sm=N/m$, so that the number of sequences m holding orthogonality can increase.

FIG. 13 shows the signature table according to Embodiment 3 of the present invention. Referring to this table, the carrier sequences a(k) are associated with the modulation sequences b(k) in advance depending on propagation loss levels. For example, the "high" propagation loss level assumes a cell radius of maximum 15 km, the "medium" propagation loss level assumes a cell radius of maximum 10 km, and the "low" propagation loss level assumes a cell radius of maximum 6 km.

Then, the "high," "medium" and "low" propagation loss levels are associated with respective carrier sequences (#1 to #3) and modulation sequences. In the modulation sequences, the associated maximum delay time $\tau=sm$ increases when the propagation loss level is higher and decreases when the propagation loss level is lower. Accordingly, the number of signatures generated decreases when the propagation loss level is higher and increases when the propagation loss level is lower.

In this way, according to Embodiment 3, the number of ZCZ-GCL sequences multiplexed, which are not orthogonal, can be reduced by classifying propagation loss levels, associating carrier sequences with modulation sequences depending on the levels and by using signatures generated by the carrier sequences and the modulation sequences depending on measured propagation loss levels in the RACH, so that it is possible to reduce inter-code interference and improve preamble detection performance. Moreover, as in Embodiment 1, the number of signatures can increase, so that it is less likely that randomly selected signatures overlap between transmitting apparatuses, and the RACH collision rate is reduced. Particularly, a transmitting apparatus that an amount of propagation delay is low can select a signature from a lot of signatures, so that it is possible to reduce the RACH collision rate further.

The length of the ZCZ-GCL sequence may be N=tm (t and m are integers). In this case, cross-correlation is zero between ZCZ-GCL sequences with sharing the same carrier sequence and yet having different modulation sequences, within the range of delay time not greater than t, and orthogonality holds within this range. Consequently, the signature table in this case is shown in FIG. 14.

Embodiment 4

In LTE, studies are being conducted for random access (Sync-RA) channel that is transmitted from mobile stations in situations where uplink transmission timings are synchronized. In Sync-RA channel, uplink synchronization is established, so that a timing error of a received signal is reduced regardless of the distance or the propagation loss level from the base station. That is, with Embodiment 4 of the present invention, in the Sync-RA channel, a signature matching the "low" propagation loss level (i.e. a cyclic shift value is low) is selected regardless of the propagation loss level.

Figure 15:
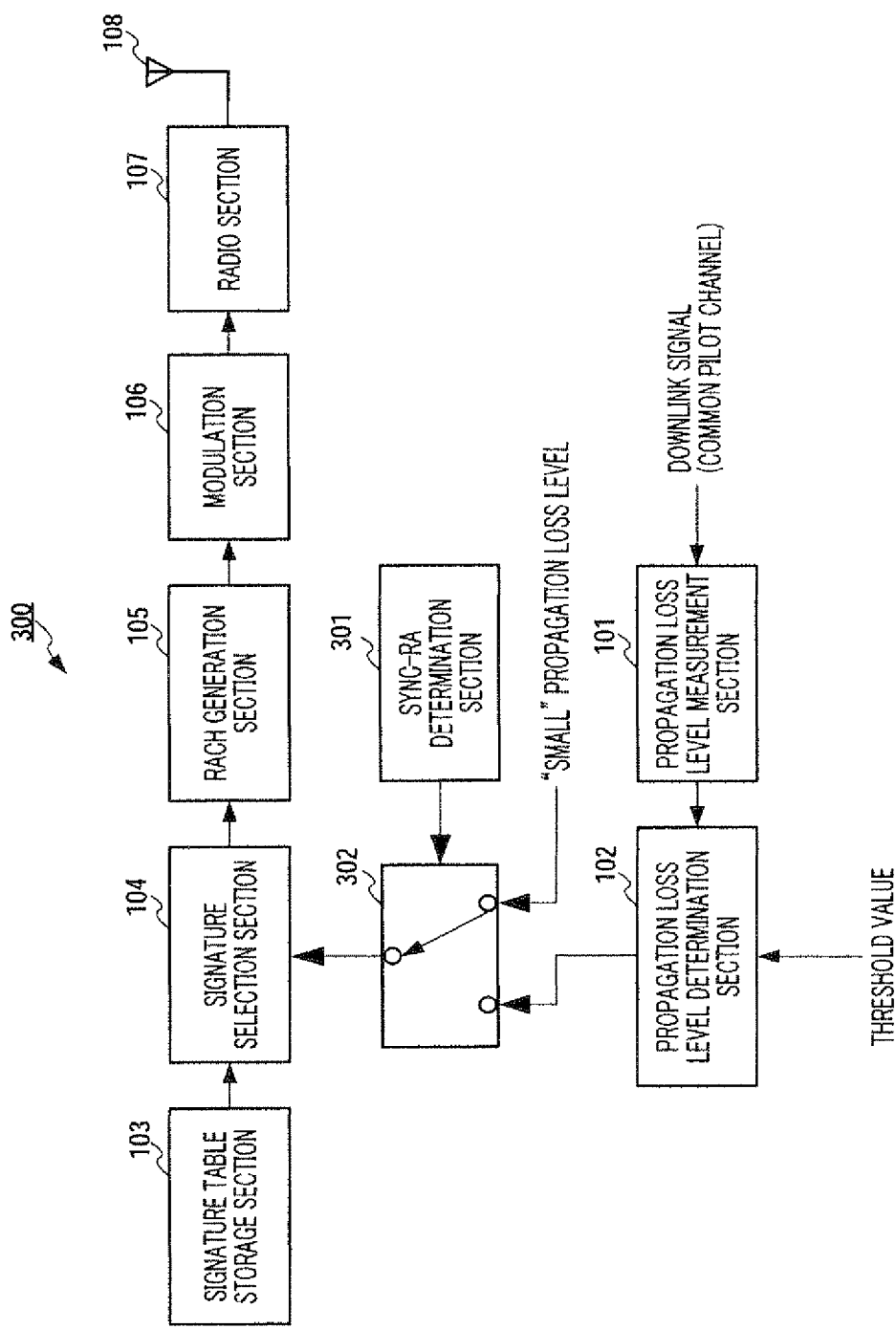
FIG. 15 is a block diagram showing the configuration of the transmitting apparatus according to Embodiment 4 of the present invention.

FIG. 15 is a block diagram showing the configuration of transmitting apparatus 300 of Embodiment 4 of the present invention. FIG. 15 is different from FIG. 4 in that Sync-RA determination section 301 and switch control section 302 are added.

Referring to FIG. 15, Sync-RA determination section 301 determines whether or not the transmitting random access is the Sync-RA channel, based on whether or not its transmission timing is controlled by the base station (i.e. whether or not synchronization is established) and outputs the determination result to switch control section 302.

If the determination result outputted from sync-RA determination section 301 is the Sync-RA channel, switch control section 302 does not measure the propagation loss level and outputs the "low" propagation loss level to signature selection section 104 in a fixed manner. Moreover, unless the determination result outputted from sync-RA determination section 301 is the Sync-RA channel, switch control section 302 outputs the measured result outputted from propagation loss level determination section 102 to signature selection section 104. By this means, when the determination result is the Sync-RA channel, signature selection section 104 selects the signature which the cyclic shift value is low.

In this way, according to Embodiment 4, in the Sync-RA channel, by definitely using a signature pattern, which is low cyclic shift value and which is generated from a single CAZAC sequence, the number of different CAZAC sequences multiplexed can be suppressed, so that it is possible to reduce inter-code interference and improve preamble detection performance.

The transmitting apparatus explained with the embodiments above is preferably provided in mobile stations in mobile communication systems.

Moreover, although cases have been described with the embodiments above where the CAZAC sequence is used for code sequences used for the signature, the present invention is not limited to this, and orthogonal sequences such as the orthogonal Gold sequence may also be used.

Moreover, although cases have been described with the embodiments where the cyclic shift value and the transmission bandwidth are controlled depending on propagation loss levels, the present invention is not limited to this, and the cyclic shift value and the transmission bandwidth may be controlled depending on downlink CQI. Downlink CQI includes RSSI (Received Signal Strength Indicator) and SIR (Signal to Interference Ratio).

Moreover, with the embodiments above, the signature numbers and control information may be uniquely associated, and, in that case, more control information can be transmitted by the mobile station, which the propagation toss level is low. MCS and transmission bandwidth selections for SDCH immediately after RACH in UL/DL is more efficient in proportion to increasing control information, so that it is possible to improve resource use efficiency. Incidentally, control information includes, for example, the buffer status, CQI information, mobility information and MIMO information of a mobile station.

Moreover, although with the embodiments above cases have been described where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2006-034297, filed on Feb. 10, 2006, and Japanese Patent Application No. 2006-205267, filed on Jul. 27, 2006, including the specifications, drawings and abstracts are incorporated herein by reference in their entirety.

INDUSTRIAL APPLICABILITY

The radio transmitting apparatus and the radio transmission method according to the present invention can reduce the RACH collision rate and prevent preamble detection performance from deteriorating, and are applicable to, for example, radio communication terminal apparatuses.

The invention claimed is:
1. A radio transmitting apparatus comprising:
  a determination section that determines whether or not uplink synchronization is established;
  a selection section that selects a signature generated from a code sequence using a cyclic shift value based on whether or not the uplink synchronization is established;
  a generating section that generates a random access signal including the selected signature; and
  a transmission section that transmits the generated random access signal on a random access channel,
    wherein, when the uplink synchronization is determined to be established, the selection section uses a cyclic shift value that is smaller than a cyclic shift value used when the uplink synchronization is determined not to be established.
2. The radio transmitting apparatus according to claim 1, wherein the determination section determines whether or not the uplink synchronization is established depending on the whether or not a terminal transmission timing is controlled by a base station.

3. The radio transmitting apparatus according to claim 1, wherein the code sequence comprises a constant amplitude zero autocorrelation sequence.

4. The radio transmitting apparatus according to claim 1, wherein the code sequence comprises a Zadoff-Chu sequence.

5. The radio transmitting apparatus according to claim 1, wherein the code sequence comprises an orthogonal Gold sequence.

6. The radio transmitting apparatus according to claim 1, wherein the code sequence comprises a zero correlation zone generalized chirp like sequence.

7. A radio transmitting apparatus comprising:
a determination section that determines whether or not uplink synchronization is established;
a selection section that selects a signature generated from a code sequence using a cyclic shift value;
a generating section that generates a random access signal including the selected signature;
a transmission section that transmits the generated random access signal on a random access channel, wherein the selection section switches the cyclic shift value based on whether or not the uplink synchronization is established; and
an estimation section that estimates an amount of propagation delay,
wherein the selection section provides in advance the code sequences and the cyclic shift values for cyclically shifting the code sequences in association with the amounts of propagation delay, and selects a signature generated from a code sequence and a cyclic shift value associated with the estimated amount of propagation delay.

8. The radio transmitting apparatus according to claim 7, wherein the selection section selects a cyclic shift value corresponding to a smaller amount of propagation delay when the uplink synchronization is determined to be established, or selects a cyclic shift value corresponding to the estimated amount of propagation delay when the uplink synchronization is determined not to be established.

9. A radio transmitting apparatus comprising:
a determination section that determines whether or not uplink synchronization is established;
a selection section that selects a signature generated from a code sequence using a cyclic shift value;
a generating section that generates a random access signal including the selected signature; and
a transmission section that transmits the generated random access signal on a random access channel, wherein the selection section switches the cyclic shift value based on whether or not the uplink synchronization is established,
wherein the code sequence comprises a zero correlation zone generalized chirp like sequence, and
wherein the selection section provides in advance modulation sequences of the zero correlation zone generalized chirp like sequence in association with the amounts of propagation delay, and selects a signature generated from the zero correlation zone generalized chirp like sequence using a modulation sequence associated with an estimated amount of propagation delay.

10. A radio transmitting method performed by a radio transmitting apparatus comprising:
determining whether or not uplink synchronization is established;
selecting a signature generated from a code sequence using a cyclic shift value based on whether or not the uplink synchronization is established;
generating a random access signal including the selected signature; and
transmitting the generated random access signal on a random access channel,
wherein, when the uplink synchronization is determined to be established, a cyclic shift value is used which is smaller than a cyclic shift value used when the uplink synchronization is determined not to be established.

* * * * *